(12) United States Patent
Adam et al.

(10) Patent No.: US 11,267,483 B2
(45) Date of Patent: Mar. 8, 2022

(54) METHOD AND APPARATUS FOR PREVENTION OF UNINTENDED LANE CHANGE MANEUVER IN AN ASSISTED DRIVING SYSTEM

(71) Applicant: GM GLOBAL TECHNOLOGY OPERATIONS LLC, Detroit, MI (US)

(72) Inventors: Paul A. Adam, Milford, MI (US); William L. Kozlowski, Novi, MI (US); Li Ji, Northville, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 172 days.

(21) Appl. No.: 16/551,153

(22) Filed: Aug. 26, 2019

(65) Prior Publication Data

US 2021/0061300 A1 Mar. 4, 2021

(51) Int. Cl.
*B60W 50/14* (2020.01)
*B60W 40/09* (2012.01)
*B60W 30/18* (2012.01)
*B60W 50/12* (2012.01)

(52) U.S. Cl.
CPC ...... *B60W 50/14* (2013.01); *B60W 30/18163* (2013.01); *B60W 40/09* (2013.01); *B60W 50/12* (2013.01); *B60W 2050/146* (2013.01); *B60W 2540/30* (2013.01)

(58) Field of Classification Search
CPC .......... B60W 50/14; B60W 30/18163; B60W 40/09; B60W 50/12; B60W 2050/146; B60W 2540/30; B60W 30/12; G08G 1/167; B62D 15/0255; G06K 9/00798
See application file for complete search history.

(56) References Cited

U.S. PATENT DOCUMENTS

| | | | |
|---|---|---|---|
| 10,011,216 B1 | 7/2018 | Rovik | |
| 2008/0183342 A1* | 7/2008 | Kaufmann | B60W 30/12 701/1 |
| 2011/0106376 A1 | 5/2011 | Tijerina et al. | |
| 2012/0083960 A1* | 4/2012 | Zhu | G05D 1/0276 701/23 |
| 2014/0371984 A1* | 12/2014 | Fung | B60W 40/08 701/38 |
| 2015/0321699 A1* | 11/2015 | Rebhan | B62D 15/0255 701/23 |

* cited by examiner

*Primary Examiner* — Rachid Bendidi
*Assistant Examiner* — Andrew J Cromer
(74) *Attorney, Agent, or Firm* — Lorenz & Kopf LLP (57) ABSTRACT

The present application relates to a method and apparatus for prevention of unintended lane change maneuver in an ADAS equipped motor vehicle performed by a sensor for detecting a driver engagement level, a memory operative to store the driver engagement level, a user interface for providing a user alert in response to an alert signal, a selector operative to generate a request for a lane change operation, and a processor operative to receive the request for the lane change operation, to compare the driver engagement level to a threshold engagement level, and to generate the alert signal in response to the driver engagement level being less than the threshold engagement level.

20 Claims, 5 Drawing Sheets

METHOD AND APPARATUS FOR PREVENTION OF UNINTENDED LANE CHANGE MANEUVER IN AN ASSISTED DRIVING SYSTEM

BACKGROUND

The present disclosure relates generally to programming motor vehicle control systems. More specifically, aspects of this disclosure relate to systems, methods and devices to identify accidental turn signal activations and to determine a driver engagement level before executing lane change maneuver in an ADAS equipped vehicle.

The operation of modern vehicles is becoming more automated, i.e. able to provide driving control with less and less driver intervention. Vehicle automation has been categorized into numerical levels ranging from zero, corresponding to no automation with full human control, to five, corresponding to full automation with no human control. Various advanced driver-assistance systems (ADAS), such as cruise control, adaptive cruise control, and parking assistance systems correspond to lower automation levels, while true "driverless" vehicles correspond to higher automation levels.

Adaptive cruise control systems have been developed where not only does the system maintain the set speed and remain centered within the current lane, but also will automatically slow the vehicle down in the event that a slower moving preceding vehicle is detected using various sensors such as radar and cameras. Lane change on demand (LCoD) may be sub-feature of lane centering (LCC). LCC allows hands off operation in conjunction with a certain amount of look away time, where driver can be looking away from the road. This creates opportunity for accidental lane change which could be initiated by driver through inadvertent bumping of turn signal selector. It would be desirable to overcome these problems to provide a method and apparatus for prevention of unintended lane change maneuver in an ADAS equipped motor vehicle.

The above information disclosed in this background section is only for enhancement of understanding of the background of the invention and therefore it may contain information that does not form the prior art that is already known in this country to a person of ordinary skill in the art.

SUMMARY

Disclosed herein are autonomous vehicle control system training systems and related control logic for provisioning autonomous vehicle control, methods for making and methods for operating such systems, and motor vehicles equipped with onboard control systems. By way of example, and not limitation, there is presented an automobile with onboard vehicle control learning and control systems.

In accordance with an aspect of the present invention, an apparatus including a sensor for detecting a driver engagement level, a memory operative to store the driver engagement level, a user interface for providing a user alert in response to an alert signal, a selector operative to generate a request for a lane change operation, and a processor operative to receive the request for the lane change operation, to compare the driver engagement level to a threshold engagement level, and to generate the alert signal in response to the driver engagement level being less than the threshold engagement level.

In accordance with another aspect of the present invention wherein the processor is further operative to perform the lane change operation in response to the driver engagement level being greater than the threshold engagement level.

In accordance with another aspect of the present invention wherein the driver engagement level is detected in response to a vehicle operator area of focus over a duration of time.

In accordance with another aspect of the present invention wherein the sensor is a driver management system operative to monitor a vehicle operator area of focus and wherein the driver engagement level is detected by the driver management system in response to the vehicle operator area of focus over a duration of time.

In accordance with another aspect of the present invention wherein the driver engagement level is determined in response to a first vehicle operator area of focus at a first time and a second vehicle operator area of focus at a second time.

In accordance with another aspect of the present invention wherein the selector is a turn signal selector.

In accordance with another aspect of the present invention including a vehicle controller for performing an assisted driving operation and wherein the driver engagement level is determined in response to the assisted driving operation being performed.

In accordance with another aspect of the present invention wherein the processor is further operative to ignore the request for the lane change operation in response to the driver engagement level being less than the threshold engagement level.

In accordance with another aspect of the present invention, a method performed by a processor including performing an assisted driving operation in a vehicle, detecting a vehicle operator area of focus by a driver monitoring system, establishing a driver engagement level in response to the vehicle operator area of focus, receiving a request for a lane change operation, comparing the driver engagement level to a threshold engagement level in response to the request for a lane change operation, and generating a user alert in response to the driver engagement level being less than the threshold engagement level.

In accordance with another aspect of the present invention including cancelling the request for the lane change operation in response to the driver engagement level being less than the threshold engagement level.

In accordance with another aspect of the present invention including performing the lane change operation in response to the driver engagement level being greater than the threshold engagement level.

In accordance with another aspect of the present invention wherein the driver engagement level is determined in response to the vehicle operator area of focus at a first time and a subsequent vehicle operator area of focus at a second time.

In accordance with another aspect of the present invention wherein the detecting the vehicle operator area of focus is performed in response to performing the assisted driving operation.

In accordance with another aspect of the present invention wherein the method is performed by an advanced driving assisted system equipped vehicle.

In accordance with another aspect of the present invention wherein the assisted driving operation is a lane centering operation.

In accordance with another aspect of the present invention wherein the request for a lane change operation is generated in response to an activation of a turn signal indicator.

In accordance with another aspect of the present invention wherein the user alert is a high intensity audio visual alert for prompting a vehicle operator re-engagement.

In accordance with another aspect of the present invention wherein the driver engagement level is a driver engagement score calculated for a plurality of vehicle operator area of focus detections over a time duration.

In accordance with another aspect of the present invention, an advanced driver assistance system for controlling a host vehicle including a driver monitoring system for detecting a first vehicle operator area of focus and a second vehicle operator area of focus and to generate a driver engagement level in response to the first vehicle operator area of focus and the second vehicle operator area of focus, a turn signal selector operative to generate a request for a lane change operation, a processor operative to receive the request for the lane change operation, to compare the driver engagement level to a threshold engagement level, to generate a user alert in response to the driver engagement level being less than the threshold engagement level, and for generating a lane change control signal in response to the driver engagement level being greater than the threshold engagement level, and a vehicle controller for performing an assisted driving operation, the vehicle controller being further operative to perform the lane change operation in response to the lane change control signal.

In accordance with another aspect of the present invention including a user interface for providing a vehicle operator reengagement request in response to the user alert.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
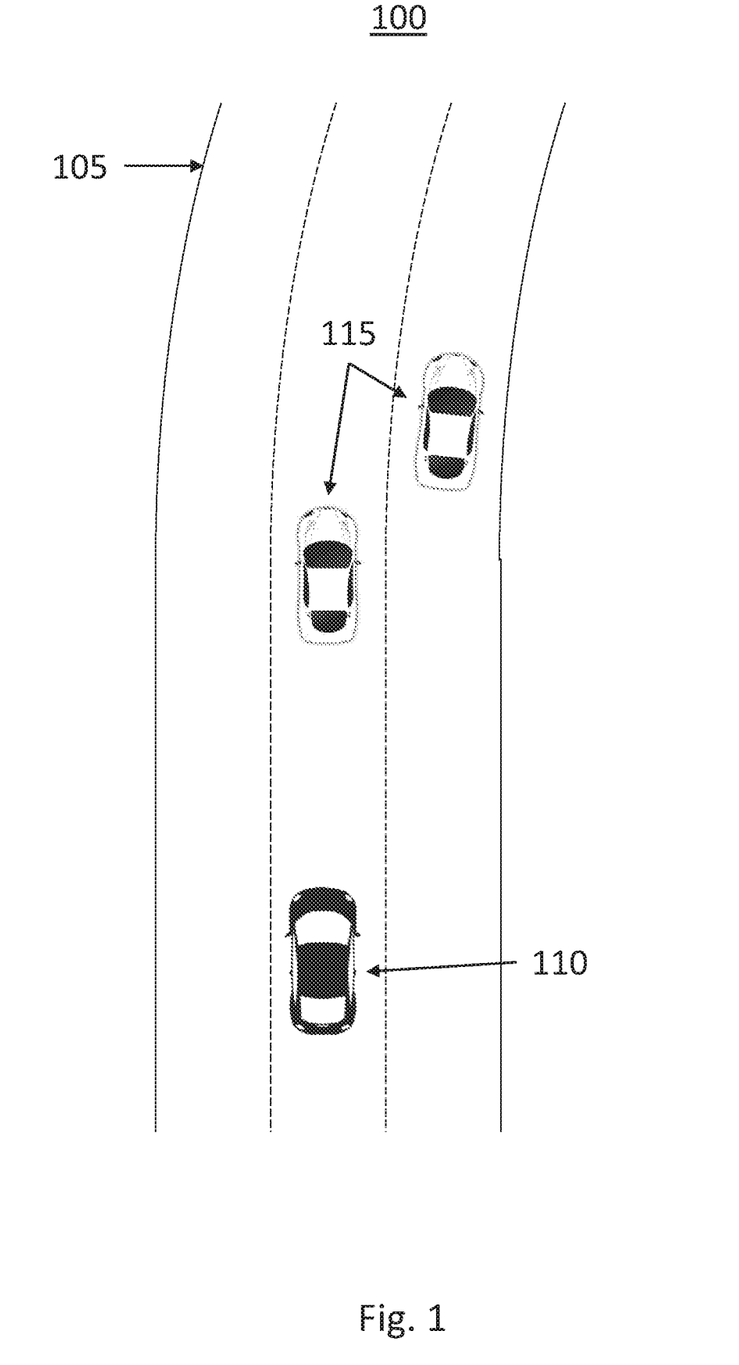
FIG. 1 shows an operating environment for prevention of unintended lane change maneuver in an ADAS equipped motor vehicle according to an exemplary embodiment.

FIG. 1 schematically illustrates an operating environment 100 for prevention of unintended lane change maneuver in a motor vehicle 110. In this exemplary embodiment of the present disclosure, the host vehicle 110 is driving on a multilane roadway 105 along with a plurality of proximate vehicles 115 also navigating the roadway 105.

In this exemplary embodiment, the host vehicle 110 is operative to perform an LCC ADAS operation. The host vehicle 110 may be traveling at a speed greater than the proximate vehicles 115 so, in this example, may soon either have to slow down to match the speed of the proximate vehicle 115 in the lane ahead of the host vehicle 110, or must make a lane change to continue travelling at its current speed. Currently, lane change on demand (LCoD) is sub-feature of lane centering (LCC). LCC allows hands off operation in conjunction with certain amount of look away time, where driver can be looking away from the road. This look away time creates an opportunity for accidental lane change which could be initiated by driver through inadvertent activation of a lane change selector.

To avoid accidental lane changes, the proposed system and method of the current disclosure teach a methodology to determine a dynamically calculated driver engagement score in order to gauge driver's awareness. In response to the driver engagement score, the methodology may deliver varying degrees of warning to a driver prior to initiating automated lane change maneuver, providing an increased time window for driver to react and override automated maneuver in case of accidental initiation. Alert methodology may vary depending on the amount of time that driver had been looking away from the road. The longer a driver has been disengaged and more complicated the current road conditions, the longer it would take for driver to be able to assess the situation.

The proposed method utilizes a driver monitoring system (DMS) to continuously monitor driver attention zone and construct driver engagement score to differentiate accidental vs. intentional turn signal activation. After a turn signal state transition indicates lane change request, the current driver engagement score is considered. If High, for example when the driver is paying attention, then no additional warning may be required beyond standard. A medium attention score may trigger an elevated level of alert. Low engagement score may trigger a high alert level or may prevent lane change from occurring all together. The exemplary method is operative to trigger dynamically adjustable levels of alert to driver prior to executing lane change maneuver, depending on current engagement score, to increase driver awareness and provide additional buffer time for overriding lane change in case of accidental activation Turning now to FIG. 2, a block diagram illustrating an exemplary implementation of a system 200 for prevention of unintended lane change maneuver in an ADAS equipped motor vehicle is shown. The system 200 includes a processor 240, a camera 220, a Lidar 222, a global positioning system (GPS) 225, a driver monitoring system (DMS) 235, a memory 245, a vehicle controller 230 a throttle controller 255, a brake controller 260 and a steering controller 270.

Figure 2:
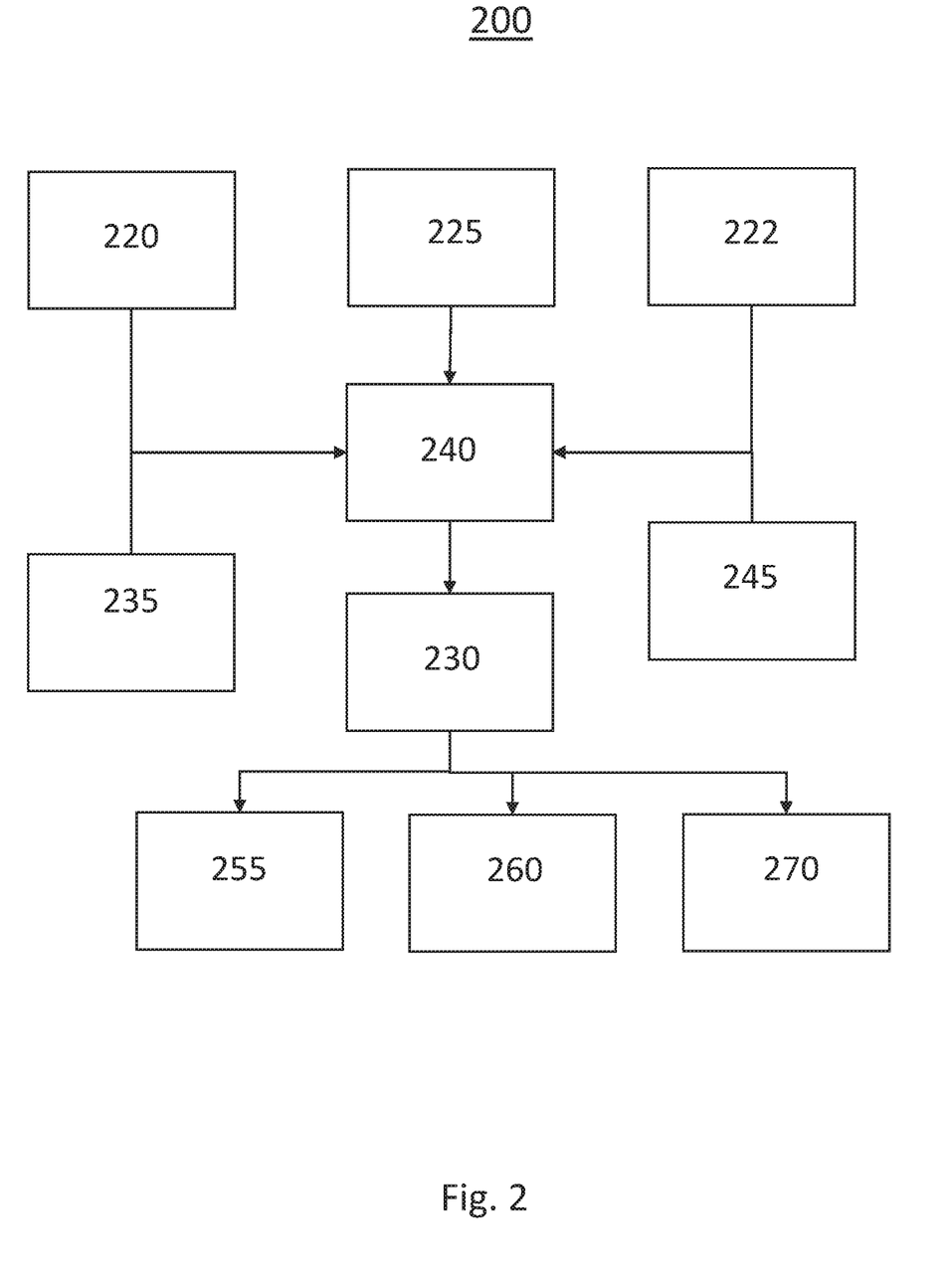
FIG. 2 shows a block diagram illustrating a system for prevention of unintended lane change maneuver in an ADAS equipped motor vehicle according to an exemplary embodiment.

While performing an exemplary ADAS operation, the system is operative to use various sensors such as a camera 220 and Lidar 222 capable of identifying and locating individual external objects. Sensor fusion algorithms provides accurate tracking of external objects as well as calculation of appropriate attributes such as relative velocities, accelerations, and the like. The camera 220 is operative to capture an image of a field of view (FOV) which may include static and dynamic objects proximate to the vehicle. Image processing techniques may be used to identify and locate objects within the FOV. These objects may then be bounded and identified as an undesirable driving area and stored in a memory or added to a reference map for the ADAS.

The Lidar 222 may be employed as a sensor on the host vehicle to detect objects around the vehicle and provide a range to and orientation of those objects using reflections from the objects providing multiple scan points that combine as a point cluster range map, where a separate scan point is provided for every ½° or less across the field-of-view (FOV) of the sensor. Therefore, if a target vehicle or other object is detected in front of the subject vehicle, there may be multiple scan points that are returned that identify the distance of the target vehicle from the subject vehicle. By providing a cluster of scan return points, objects having various and arbitrary shapes, such as trucks, trailers, bicycle, pedestrian, guard rail, etc., can be more readily detected, where the bigger and/or closer the object to the subject vehicle the more scan points are provided.

The Lidar 222 is operative to generate a laser beam, transmit the laser beam into the FOV and capture energy reflected from a target. The Lidar 222 may employ time-of-flight to determine the distance of objects from which the pulsed laser beams are reflected. The oscillating light signal is reflected off of the object and is detected by the detector within the Lidar 222 with a phase shift that depends on the distance that the object is from the sensor. An electronic phase lock loop (PLL) may be used to extract the phase shift from the signal and that phase shift is translated to a distance by known techniques.

The GPS sensor 225 may be operative to receive a plurality of time stamped satellite signals including the location data of a transmitting satellite. The GPS then uses this information to determine a precise location of the GPS sensor 225. The processor 240 may be operative to receive the location data from the GPS sensor 225 and/or store this location data to the memory 245. The memory 245 may be operative to store map data for use by the processor 220.

The DMS 235 is operative to assess a driver engagement level during operation of the vehicle. The DMS may be operative to monitor the driver engagement via a DMS camera and image recognition techniques. In particular, the driver engagement level may be determined in response to a driver's eye position and estimated location of the driver's gaze determined in response to an image captured by a DMS camera or the like.

In this exemplary embodiment, the processor 240 is operative to initiate an ADAS algorithm by generating a control signal for coupling to the vehicle controller 230 or by performing the ADAS algorithm. The ADAS operation may be an adaptive cruise control operation, a lane centering operation or the like. The processor 240 may be further operative to perform the DMS operation or may receive information from the DMS 235. The DMS operation is operative to monitor the driver engagement where driver engagement may be determined in response to a driver's eye position determined in response to an image captured by a DMS camera or the like. Alternatively, the DMS may monitor steering wheel feedback, head position, driver's seat pressure switches or the like.

The processor 240 is further operative to generate driver score in response to the DMS monitoring. In an exemplary embodiment, the driver engagement score may be calculated for a moving sample FIFO window. Once the driver is deemed to be disengaged, driver engagement may be recovered in response to multiple positive engagement samples to allow the driver time to reacquire and process the current driving situation. The driver engagement score may be updated in response to each DMS detection.

The processor 240 is further operative to monitor for a turn signal activation and to compare the driver engagement score to a threshold value. In response to this comparison, the processor 240 may be operative to initiate an operator alert of varying intensities depending on the level of engagement of the driver. For example, if the driver has a low engagement score the processor 240 may be operative to activate a high Intensity audio visual alert. If the driver has a higher engagement score, the processor 240 may activate an audio visual alert for driver reengagement or may generate a control signal to couple to the vehicle controller 230 to actuate the requested lane change operation.

The vehicle controller 230 may generate control signals for coupling to other vehicle system controllers, such as a throttle controller 255, a brake controller 260 and a steering controller 270 in order to control the operation of the vehicle in response to the ADAS algorithm. The vehicle controller may be operative to adjust the speed of the vehicle by reducing the throttle via the throttle controller 255 or to apply the friction brakes via the brake controller 260 in response to a control signals generated by the processor 240. The vehicle controller may be operative to adjust the direction of the vehicle controlling the vehicle steering via the steering controller 270 in response to a control signals generated by the processor 240.

Figure 3:
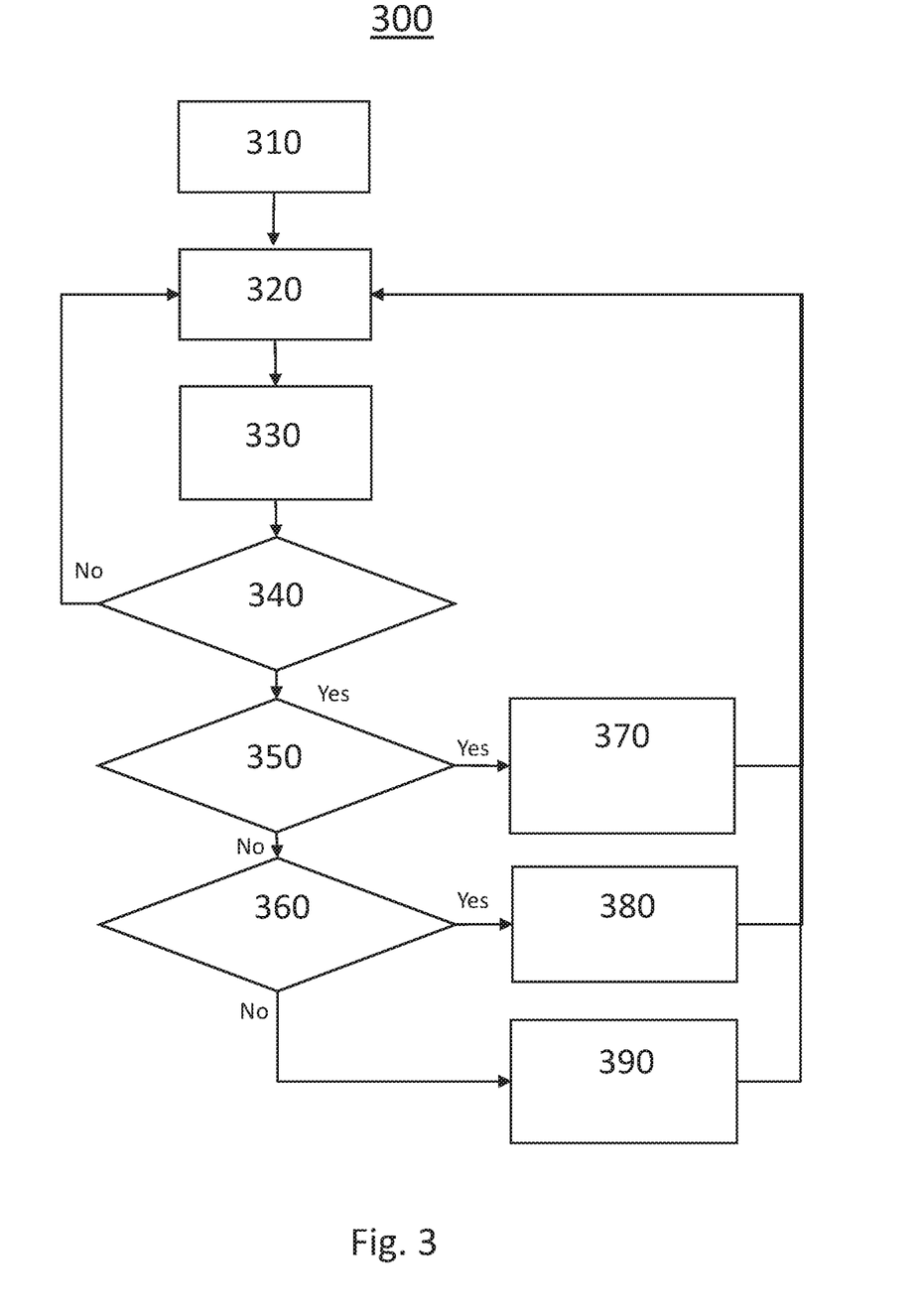
FIG. 3 shows a flow chart illustrating a method for prevention of unintended lane change maneuver in an ADAS equipped motor vehicle according to another exemplary embodiment.

Turning now to FIG. 3, a flow chart illustrating an exemplary implementation of a method 300 for prevention of unintended lane change maneuver in an ADAS equipped motor vehicle is shown. The method is first operative to engage 310 an ADAS algorithm. The ADAS operation may be an adaptive cruise control operation, a lane centering operation or the like. The ADAS may be engaged in response to a user input via a user interface or may be initiated by a vehicle controller in response to another ADAS operation.

In response to the engagement of the ADAS operation, the method is next operative to perform 320 the DMS operation. The DMS is operative to monitor the driver engagement. The driver engagement may be determined in response to a driver's eye position determined in response to an image captured by a DMS camera or the like. For example, in response to the captures image, a level of driver engagement may be assessed in response to an area of driver focus. If a driver is looking forward, at the road, a high value may be assigned to driver engagement. If the driver appears to be looking down, into their lap, a lower value may be assigned. Likewise, if the driver is looking toward the center console of the vehicle, has eyes closed, driver is in micro-sleep or driver is fully asleep, progressively lower driver engagement scores will be assigned. In alternate embodiment, the DMS may monitor steering wheel feedback, head position, driver's seat pressure switches or the like.

In response to the DMS operation, the method is next operative to generate 330 driver score in response to the monitoring. In an exemplary embodiment, the driver engagement score may be calculated for a moving sample FIFO window. In an exemplary embodiment, once the driver is deemed to be disengaged, driver engagement may only be recovered in response to multiple positive engagement samples to allow the driver time to require and process the current driving situation. The driver engagement score may be updated in response to each DMS detection.

The method is next operative to monitor 340 for a turn signal activation. If a turn signal has not been activated, the method is operative to return to acquire 320 a subsequent DMS detection and to update the driver engagement score. If a turn signal has been active, the method is next operative to compare 350 the driver engagement score to a threshold value. If the driver engagement score is less than a medium threshold, the method is operative to activate 370 a high intensity audio visual alert. If the driver engagement score 360 is less than a higher threshold, an audio visual alert for driver reengagement may be activated 380. If the driver engagement score exceeds the higher threshold, indicating that the driver is sufficiently engaged in vehicle operation monitoring and that the turn signal activation was likely intentional, the method is then operative to perform 390 the lane change. The method is then operative to return to acquiring a driver attention level sample and to update the driver engagement score.

Figure 4:
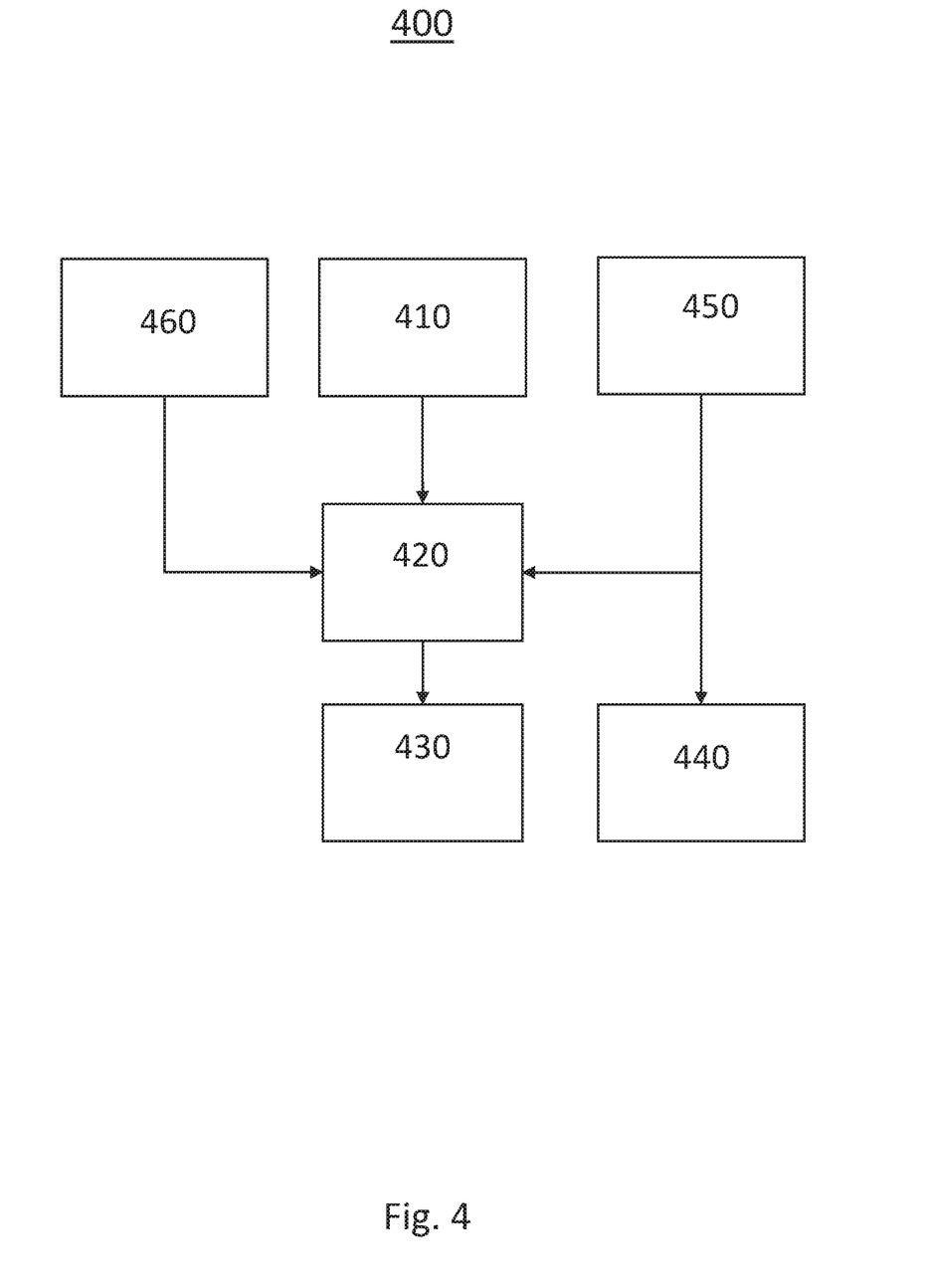
FIG. 4 shows a block diagram illustrating a system for prevention of unintended lane change maneuver in an ADAS equipped motor vehicle according to another exemplary embodiment.

Turning now to FIG. 4, a block diagram illustrating another exemplary implementation of a system 400 for prevention of unintended lane change maneuver in an ADAS equipped motor vehicle is shown. The system may be an advanced driver assistance system for controlling a host vehicle having a sensor 410, a processor 420, a vehicle controller 430, a memory 440 and a user interface 450 and a selector 460. In this exemplary embodiment, the sensor 410 is operative for detecting a driver engagement level. The sensor 410 may be a driver management system equipped with a visual sensor, such as a camera or the like, operative to monitor a vehicle operator area of focus and wherein the driver engagement level is detected by the driver management system in response to the vehicle operator area of focus over a duration of time. In an alternate embodiment, the driver engagement level may be determined in response to a first vehicle operator area of focus at a first time and a second vehicle operator area of focus at a second time.

The exemplary system 400 further includes a memory 440 operative to store the driver engagement level. The memory 440 may store a plurality of driver engagement level determinations periodically. An overall driver engagement level may be determined in response to a moving sample of the periodic driver engagement determinations.

The exemplary system 400 may further include a user interface 450 for providing a user alert in response to an alert signal. The user interface 450 may include a visual interface, audio interface, or haptic interface, such as a video screen, series of LED lights, speaker, haptic seat and/or haptic steering wheel. The user alert may be generated in response to a signal from the processor in order to alert the vehicle operator that a disengagement event may occur or that the user engagement is insufficient for continued ADAS operation.

A selector 460 is provided operative to generate a request for a lane change operation. In this exemplary embodiment, the selector 460 may be a turn signal selector. In some ADAS systems, a lane change request may be initiated in response to a vehicle operator activating a turning signal using the selector 460. For example, during an adaptive cruise operation, a vehicle operator may wish to move from the currently occupied lane to a lane immediately to the left. The driver would then activate the left turn signal and a lane change request is generated and coupled to the processor 420. The processor 420 may then be operative to perform the lane change operation to the left. However, if the driver is not sufficiently engaged in monitoring operation of the vehicle and the selector 460 is activated, the request for a lane change operation may be accidental. It is desirable for the system to determine that the driver is not sufficiently engaged when the selector is activated, clear the request for the lane change, and provide a user alert of the accidental lane change request.

The processor 420 may be an ADAS processor, and may be operative to receive the request for the lane change operation from the selector. The processor 420 may then be further operative to compare the driver engagement level to a threshold engagement level and to generate the alert signal in response to the driver engagement level being less than the threshold engagement level. The processor 420 may be is further operative to ignore the request for the lane change operation in response to the driver engagement level being less than the threshold engagement level. Alternatively, the processor 420 may be operative to perform the lane change operation in response to the driver engagement level being greater than the threshold engagement level. The exemplary system may further include a vehicle controller 430 for performing an assisted driving operation and the lane change operation in response to an indication from the processor 420 to perform the lane change operation or indicative of a driver engagement level is sufficient for the lane change operation to be performed.

Figure 5:
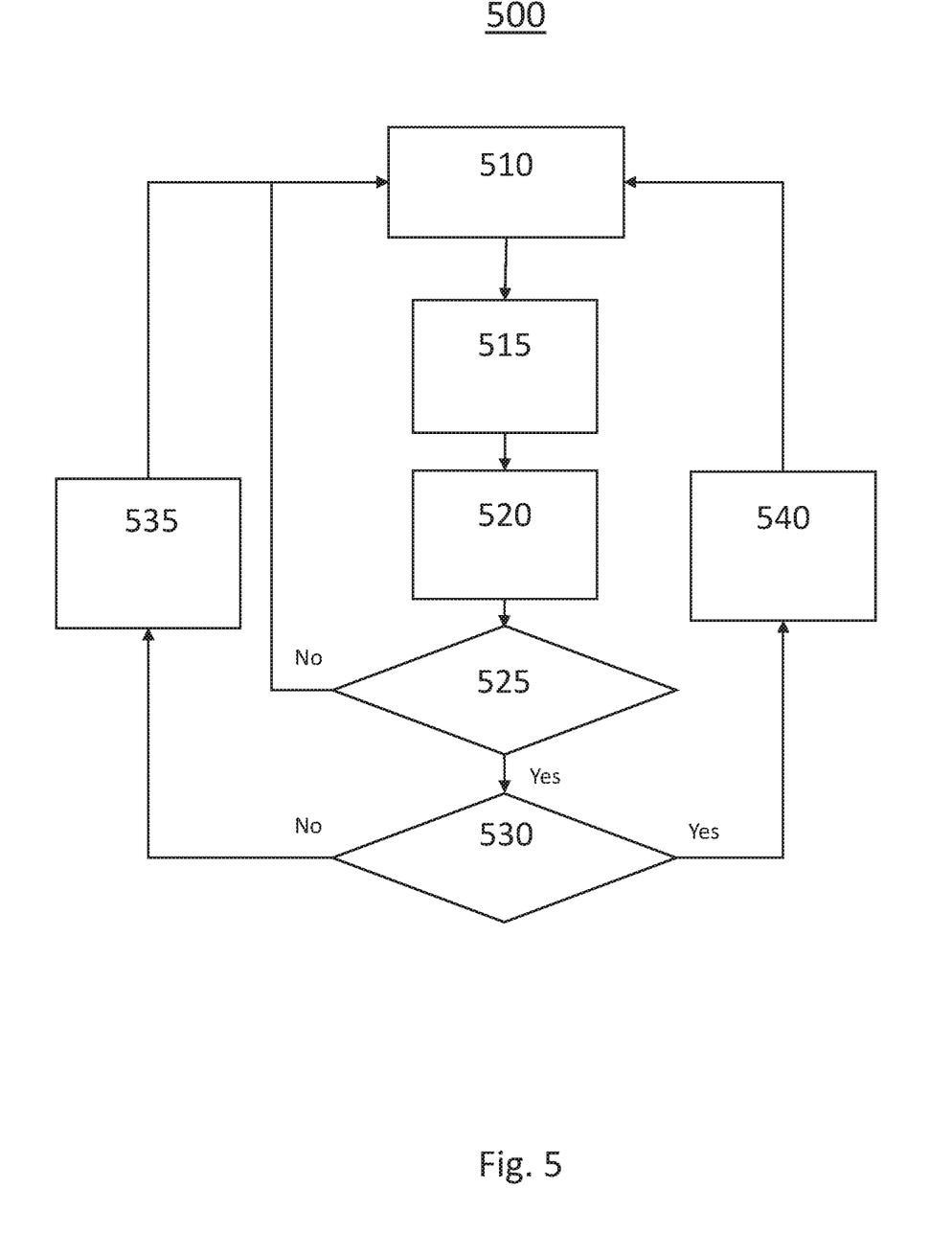
FIG. 5 shows a flow chart illustrating a method for prevention of unintended lane change maneuver in an ADAS equipped motor vehicle according to another exemplary embodiment.

Turning now to FIG. 5, a flow chart illustrating an exemplary implementation of a system 500 for prevention of unintended lane change maneuver in an ADAS equipped motor vehicle is shown. The method is first operative to perform 510 an assisted driving operation in a vehicle. The assisted driving operation may include an adaptive cruise control operation, a lane centering operation, or the like. With a level one or level two autonomous vehicle, once the assisted driving operation is being performed by the method, the driver must remain engaged to actively monitor the vehicle's operation and be ready to intervene at any time. To ensure that the driver is ready to intervene, a DMS is used to monitor the driver's level of engagement.

The method is next operative for detecting 515 a vehicle operator area of focus by using a DMS. The detecting of the vehicle operator area of focus is performed in response to performing the assisted driving operation. The DMS may be operative to monitor the eye position of a vehicle operator to estimate if the vehicle operation is engaged with the vehicle operation or is distracted by a something other than the vehicle operation. The method may determine a level of engagement in response to the area of focus of the vehicle operator. For example, a vehicle operator looking at the center stack display unit may be assigned a higher level of engagement than a vehicle operator with his/her eyes closed.

The method is next operative for establishing 520 a driver engagement level in response to the vehicle operator area of focus. The driver engagement level may be determined in response to a plurality of eye position samples over a moving time duration. The driver engagement level may be determined in response to the vehicle operator area of focus at a first time and a subsequent vehicle operator area of focus at a second time. For example, the driver engagement level may be established in response to an average value for the previous ten eye position samples taken one second apart. In this exemplary embodiment, a driver who is looking forward towards the road for 9 of the 10 previous samples, but had eyes closed for one of the 10 previous samples, would have a higher driver engagement level than a driver who had eyes closed for 9 of the 10 previous samples and looking at the road for 1 of the 10 previous samples.

The method is next operative for receiving 525 a request for a lane change operation. In this exemplary embodiment, the request for the lane change operation may be received in response to a vehicle operator activation of a turn signal selector. The method is then operative for comparing 530 the driver engagement level to a threshold engagement level in response to the request for a lane change operation. The threshold engagement level may be a level at which there is sufficient confidence that the driver is engaged in the vehicle operation and that the activation of the turn signal selector was not made inadvertently.

There may be multiple threshold for driver engagement level where the method may perform different actions in response to the multiple driver engagement levels. For example, a high intensity alert may be provided for a low driver engagement level, an alert with prompt to confirm lane change request may be generated in response to a mid-range driver engagement level and the lane change may be executed without vehicle operator confirmation in response to a high driver engagement level.

In an exemplary embodiment, in response to comparing the driver engagement level to the threshold engagement level the method may next be operative for generating 535 a user alert in response to the driver engagement level being less than the threshold engagement level. The method may next cancel the request for the lane change operation in response to the driver engagement level being less than the threshold engagement level. Alternatively, the method may perform 540 the lane change operation in response to the driver engagement level being greater than the threshold engagement level.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
   a sensor for detecting a driver engagement level in response to a first vehicle operator area of focus and an updated driver engagement level in response to a second vehicle operator area of focus;
   a memory operative to store the driver engagement level;
   a user interface for providing a user alert in response to an alert signal;
   a selector operative to generate a request for a lane change operation; and
   a processor operative to receive the request for the lane change operation, to compare the driver engagement level to a threshold engagement level, and to generate the alert signal in response to the driver engagement level being less than the threshold engagement level, the processor being further operative to compare the updated driver engagement level to the threshold engagement level in response to the generation of the alert signal and perform the lane change operation in response to the updated driver engagement level being greater than the threshold engagement level.

2. The apparatus of claim 1 wherein the processor is further operative to perform the lane change operation in response to the driver engagement level being greater than the threshold engagement level.

3. The apparatus of claim 1 wherein the driver engagement level is detected in response to a vehicle operator area of focus over a duration of time.

4. The apparatus of claim 1 wherein the sensor is a driver management system operative to monitor a vehicle operator area of focus and wherein the driver engagement level is detected by the driver management system in response to the vehicle operator area of focus over a duration of time.

5. The apparatus of claim 1 wherein the driver engagement level is determined in response to the first vehicle operator area of focus at a first time and the second vehicle operator area of focus at a second time.

6. The apparatus of claim 1 wherein the selector is a turn signal selector.

7. The apparatus of claim 1 further including a vehicle controller for performing an assisted driving operation and wherein the driver engagement level is determined in response to the assisted driving operation being performed.

8. The apparatus of claim 1 wherein the processor is further operative to ignore the request for the lane change operation in response to the driver engagement level being less than the threshold engagement level.

9. A method performed by a processor comprising:
   performing an assisted driving operation in a vehicle;
   detecting a first vehicle operator area of focus by a driver monitoring system;
   establishing a driver engagement level in response to the first vehicle operator area of focus and an updated driver engagement level in response to a subsequent vehicle operator area of focus;
   receiving a request for a lane change operation;
   comparing the driver engagement level to a threshold engagement level in response to the request for a lane change operation;
   generating a user alert in response to the driver engagement level being less than the threshold engagement level;
   establishing an updated driver engagement level in response to a subsequent vehicle operator area of focus;
   comparing the updated driver engagement level to the threshold engagement level in response to the generation of the alert signal; and
   performing the lane change operation in response to the updated driver engagement level being greater than the threshold engagement level.

10. The method of claim 9 further including cancelling the request for the lane change operation in response to the driver engagement level being less than the threshold engagement level.

11. The method of claim 9 further including performing the lane change operation in response to the driver engagement level being greater than the threshold engagement level.

12. The method of claim 9 wherein the driver engagement level is determined in response to the vehicle operator area of focus at a first time and a subsequent vehicle operator area of focus at a second time.

13. The method of claim 9 wherein the detecting the vehicle operator area of focus is performed in response to performing the assisted driving operation.

14. The method of claim 9 wherein the method is performed by an advanced driving assisted system equipped vehicle.

15. The method of claim 9 wherein the assisted driving operation is a lane centering operation.

16. The method of claim 9 wherein the request for a lane change operation is generated in response to an activation of a turn signal indicator.

17. The method of claim 9 wherein the user alert is a high intensity audio visual alert for prompting a vehicle operator re-engagement.

18. The method of claim 9 wherein the driver engagement level is a driver engagement score calculated for a plurality of vehicle operator area of focus detections over a time duration.

19. An advanced driver assistance system for controlling a host vehicle comprising:
a driver monitoring system for detecting a first vehicle operator area of focus to generate a driver engagement level in response to the first vehicle operator area of focus, for detecting a second vehicle operator area of focus and to generate an updated driver engagement level in response to a second vehicle operator area of focus;
a turn signal selector operative to generate a request for a lane change operation;
a processor operative to receive the request for the lane change operation, to compare the driver engagement level to a threshold engagement level, to generate a user alert in response to the driver engagement level being less than the threshold engagement level, to compare the updated driver engagement level to the threshold engagement level in response to the generation of the user alert, and for generating a lane change control signal in response to the updated driver engagement level being greater than the threshold engagement level; and
a vehicle controller for performing an assisted driving operation, the vehicle controller being further operative to perform the lane change operation in response to the lane change control signal.

20. The advanced driver assistance system for controlling the host vehicle of claim 19 a user interface for providing a vehicle operator reengagement request in response to the user alert and wherein the lane change control signal is generated in response in response to a user response to the vehicle operator reengagement request.

* * * * *